United States Patent
Wild et al.

(10) Patent No.: US 10,473,175 B1
(45) Date of Patent: Nov. 12, 2019

(54) SYSTEMS AND METHODS FOR MINIATURIZED DRAWBAR EXTENSION SPRINGS

(71) Applicant: National Technology & Engineering Solutions of Sandia, LLC, Albuquerque, NM (US)

(72) Inventors: Ronald Lee Wild, Albuquerque, NM (US); Brad Boyce, Albuquerque, NM (US); Audrey Morris-Eckart, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 81 days.

(21) Appl. No.: 15/924,572

(22) Filed: Mar. 19, 2018

(51) Int. Cl.
F16F 1/12 (2006.01)
F16F 3/04 (2006.01)

(52) U.S. Cl.
CPC ............... *F16F 1/126* (2013.01); *F16F 3/04* (2013.01)

(58) Field of Classification Search
CPC .. F16F 1/126; F16F 3/04; B60D 1/155; B60D 1/167; B60D 1/1675
USPC ................................................... 267/70, 72
See application file for complete search history.

(56) References Cited

U.S. PATENT DOCUMENTS

| | | | | |
|---|---|---|---|---|
| 272,024 A * | 2/1883 | Brown | | |
| 311,260 A * | 11/1885 | Rohrer | | |
| 395,297 A * | 12/1888 | Skiles | | |
| 593,788 A * | 11/1897 | Stone | | |
| 1,194,417 A * | 8/1916 | Pelham | ................ | B60C 27/12 267/72 |
| 1,482,918 A * | 2/1924 | Dutcher | ................ | A47D 13/107 267/72 |
| 1,633,512 A * | 6/1927 | Bateson | ................ | B60C 27/12 267/72 |
| 2,248,447 A | 7/1941 | Wood | | |
| 2,509,274 A * | 5/1950 | Nugey | ................ | F16F 3/04 267/70 |
| 5,482,258 A * | 1/1996 | Clauson | ................ | F16F 7/00 114/230.2 |
| 5,624,321 A | 4/1997 | Snyder | | |
| 6,345,583 B1 * | 2/2002 | Thackston | ................ | B63B 21/20 114/213 |
| 6,402,472 B1 | 6/2002 | Hogue et al. | | |

(Continued)

*Primary Examiner* — Melanie Torres Williams
(74) *Attorney, Agent, or Firm* — Samantha Updegraff; Mark A. Dodd

(57) ABSTRACT

Extension springs that can be manufactured to a small size with a precise free length are described herein. An extension spring comprises a first drawbar member and a second drawbar member that extend along a same direction. The extension spring further comprises a compression spring coil that surrounds respective portions of the draw bar members. At either end of the spring coil are positioned end caps that surround the drawbar members. The end caps provide flat surfaces on which the ends of the spring coil rest in a resting position of the extension spring. The end caps are held against bent ends of arms of the drawbar members by tension of the spring coil. When the drawbar members are drawn apart from one another, the end caps compress the spring coil. Compression of the spring coil causes forces that resist the motion of the drawbar members apart from one another.

13 Claims, 13 Drawing Sheets

(56) References Cited

U.S. PATENT DOCUMENTS

| | | | |
|---|---|---|---|
| 7,322,568 B2 * | 1/2008 | Peeters | A01D 78/14 267/70 |
| 2012/0273647 A1 | 11/2012 | Moruzzi | |

* cited by examiner

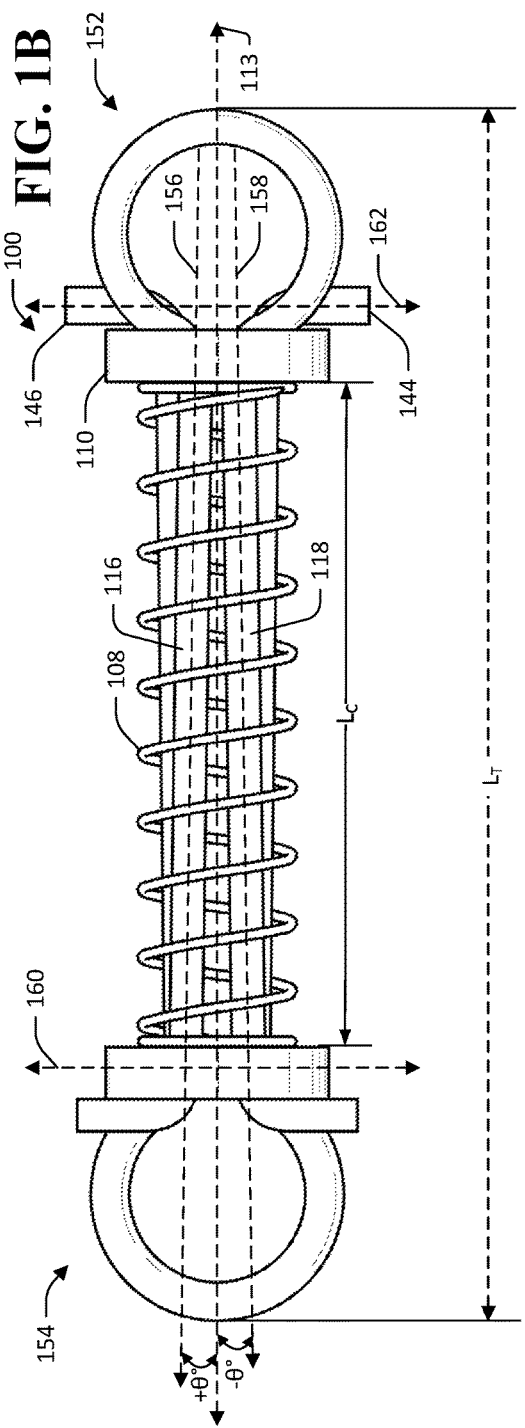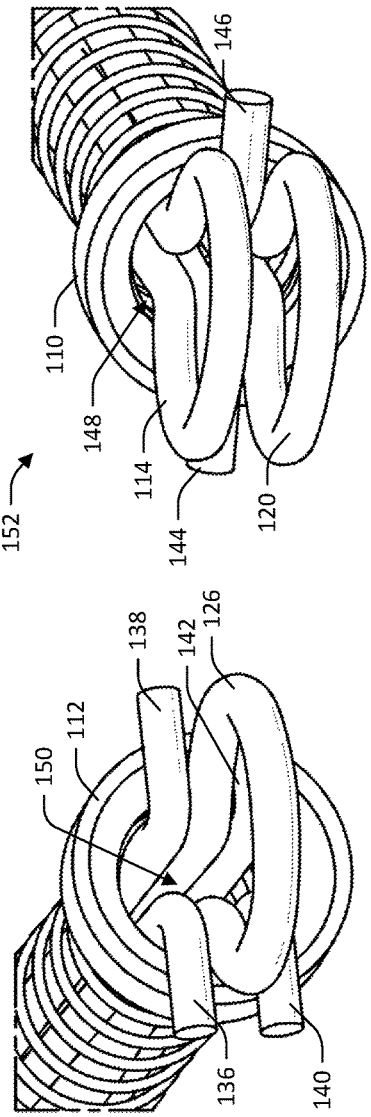

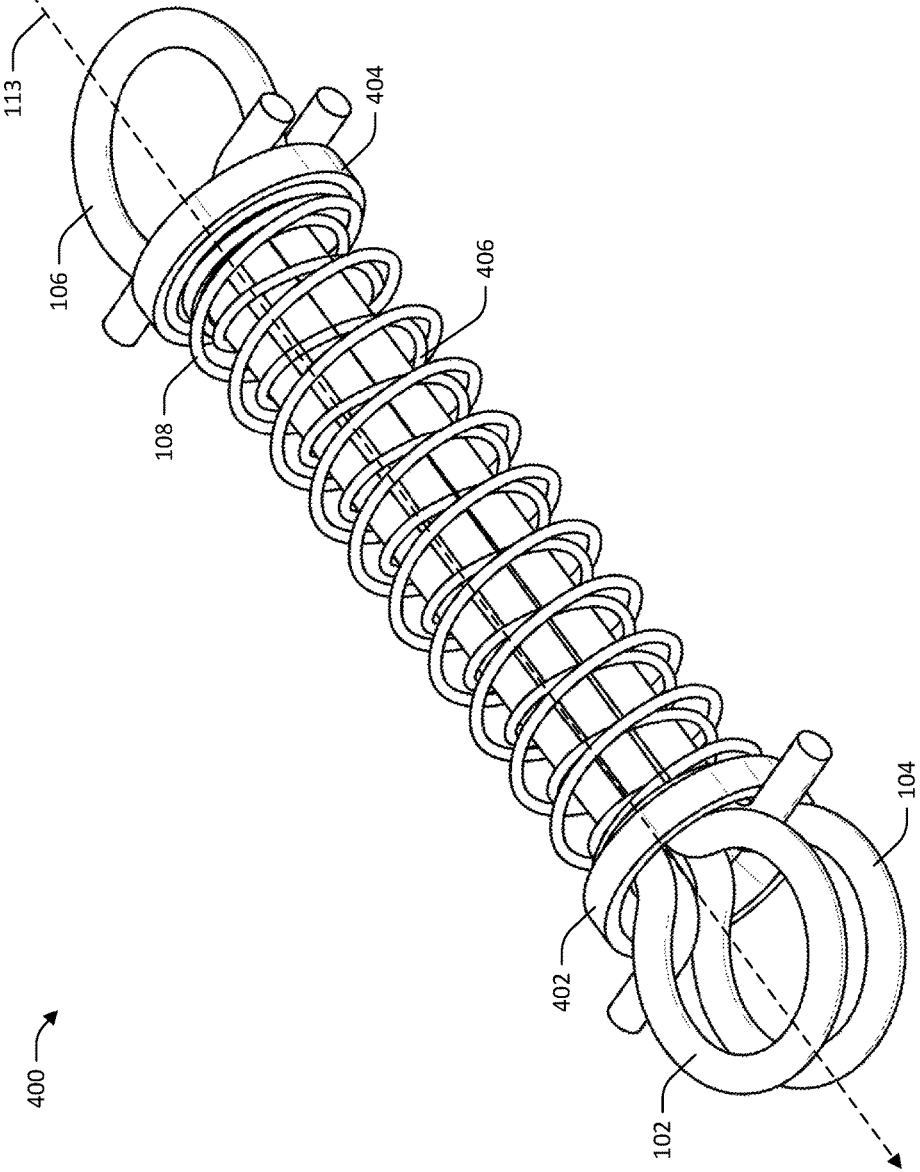

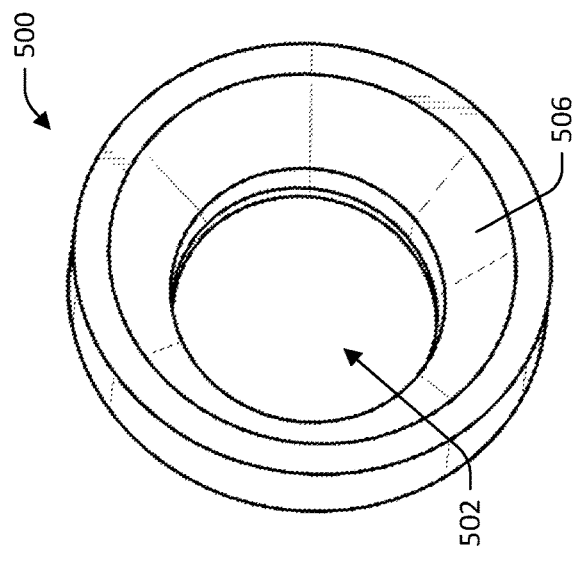
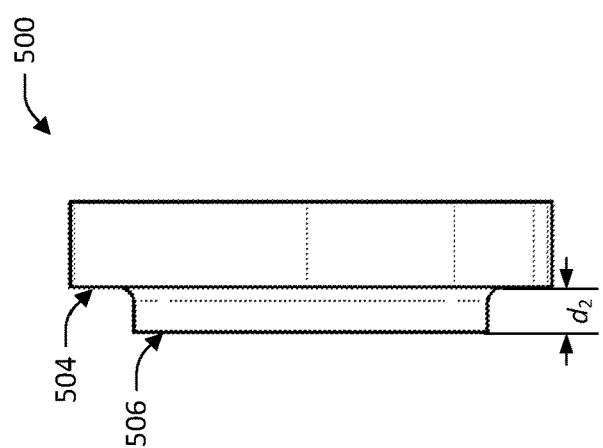
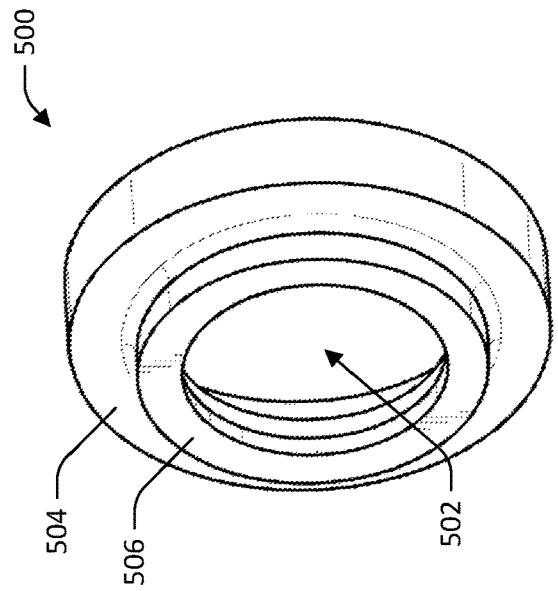

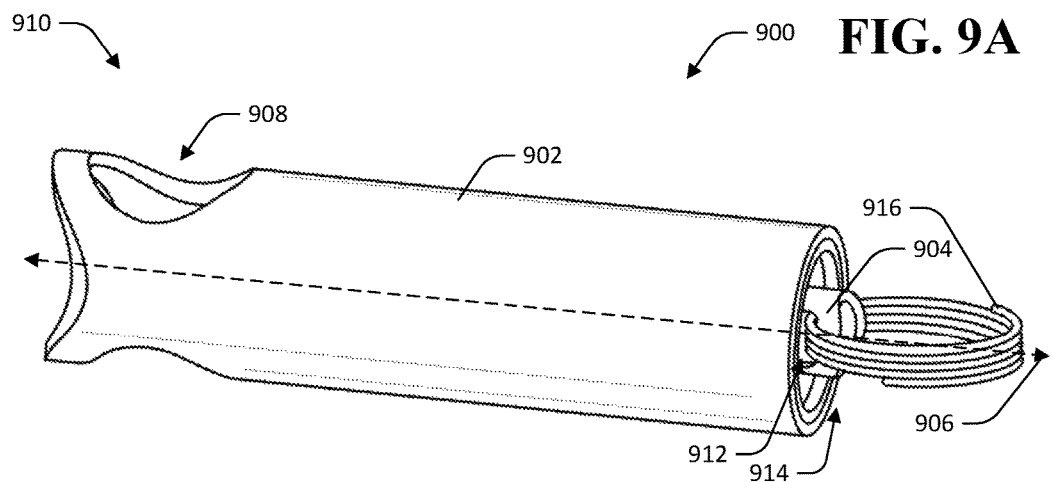
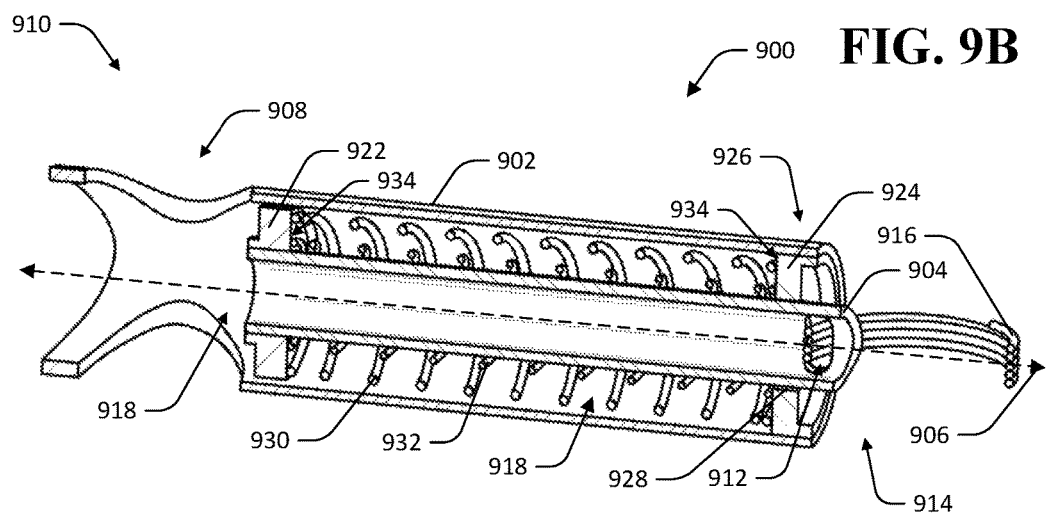

SYSTEMS AND METHODS FOR MINIATURIZED DRAWBAR EXTENSION SPRINGS

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Many types of springs have been developed for use in a variety of mechanical applications where particular force-displacement characteristics are required. Many of these spring designs are not suitable for applications requiring springs of small size and precise free length, however, since they cannot be manufactured to suitably precise tolerances on various physical dimensions. Small-size extension springs have been developed that consist of a single wire preformed into a coil and having hooks at either end. These extension springs can be manufactured to relatively precise tolerance on physical dimensions. However, these conventional extension spring designs have various drawbacks.

First, a conventional extension spring is prone to failure due to mechanical stresses at end hooks of the extension spring whereby the spring is attached to a spring post. Failure mode of the extension spring in such cases is generally catastrophic, causing complete failure of the spring. Second, in the conventional extension spring, the coil of the spring is subject to forces due to shock or vibration that can cause transverse deflection of the spring coil. These transverse deflections can cause the end hooks of the extension spring to disengage from their posts or can cause the spring coil to make contact and interfere with other components of a mechanical system in which the extension spring is employed.

SUMMARY

The following is a brief summary of subject matter that is described in greater detail herein. This summary is not intended to be limiting as to the scope of the claims.

Technologies pertaining to a drawbar extension spring that can be reliably manufactured in small sizes (e.g., less than 0.75 inch in length) and to tight physical tolerance (e.g., less than ±10% variation from a nominal free length of the drawbar extension spring) are described herein, wherein such a design can be referred to as a "miniaturizable drawbar extension spring" (MDE spring).

In a first embodiment, an MDE spring comprises a spring coil, a first drawbar member, and a second drawbar member. The drawbar members extend along an axial direction that is parallel to an axis of the spring coil, such that the spring coil surrounds at least a portion of each of the drawbar members. The MDE spring further comprises a first end cap and a second end cap. The first end cap encircles the drawbar members at a first end of the MDE spring, and the second end cap encircles the drawbar members at a second end of the MDE spring. The end caps are positioned along the drawbar members such that, when the drawbar members are moved away from one another along the axial direction, a respective force is exerted on each of the end caps that causes the end caps to move toward one another. The spring coil is positioned between the first end cap and the second end cap such that, when the end caps are forced toward one another, compression of the spring exerts a force that opposes the motion of the end caps. Thus, in the MDE spring, a force that pulls the drawbars apart is resisted by compression of the spring coil. In the MDE spring, the end caps facilitate manufacture of the MDE spring to have a precise free length (e.g., from a nominal free length, less than ±20% variation, less than ±15% variation, less than ±10% variation) for small sizes of the MDE spring (e.g., length of less than 1.5 inches, length of less than 1 inch, length of less than 0.75 inch). Furthermore, the drawbar members damp transverse deflections of the spring coil, thereby improving reliability of the MDE spring relative to conventional extension springs in applications where a spring can experience shock or vibration.

In a second embodiment, an MDE spring comprises a spring coil, a first drawbar, a second drawbar, and a third drawbar. Each of the three drawbars extends along an axial direction that is parallel to an axis of the spring coil, such that the spring coil surrounds at least a portion of each of the three drawbars. The second exemplary MDE spring also comprises end caps that encircle the three drawbars and are positioned at either end of the spring coil. In the second exemplary MDE spring, the third drawbar is positioned between the first drawbar and the second drawbar such that the first drawbar and the second drawbar inhibit rotation of the third drawbar relative to the first drawbar and the second drawbar. As the third drawbar is drawn along the axial direction away from the first drawbar and the second drawbar, compression of the spring coil by the end caps causes a force that opposes the motion of the third drawbar along the axial direction.

In a third embodiment, an MDE spring comprises a spring coil, a first member, and a second member. The first and second members extend along an axial direction parallel to an axis of the spring coil such that the spring coil surrounds at least a portion of the first member. The MDE spring further comprises first and second end caps, wherein the first end cap is attached to a first end of the first member, and the second end cap is attached to a first end of the second member. The spring coil is disposed between the first end cap and the second end cap. As the first member is drawn along the axial direction away from the second member, the first end cap attached to the first member compresses the spring coil against the second end cap attached to the second member, thereby resulting in a force that opposes the motion of the first member.

In various embodiments, a second spring coil is added to a miniaturized drawbar extension spring. The second spring coil provides redundancy such that failure of one of the spring coils in the miniaturized drawbar extension spring does not cause total failure of the miniaturized drawbar extension spring itself.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 1B is a top-down view of the first exemplary MDE spring.

FIG. 1C is a perspective view of a first end of the first exemplary MDE spring.

FIG. 1D is a perspective view of a second end of the first exemplary MDE spring.

FIG. 4 is a perspective view of a second exemplary MDE spring.

FIGS. 5A-5C are various perspective views of an end cap in the second exemplary MDE spring.

FIG. 9A is a perspective view of a fifth exemplary MDE spring.

FIG. 9B is a perspective cutaway view of the fifth exemplary MDE spring.

DETAILED DESCRIPTION

Figure 1A:
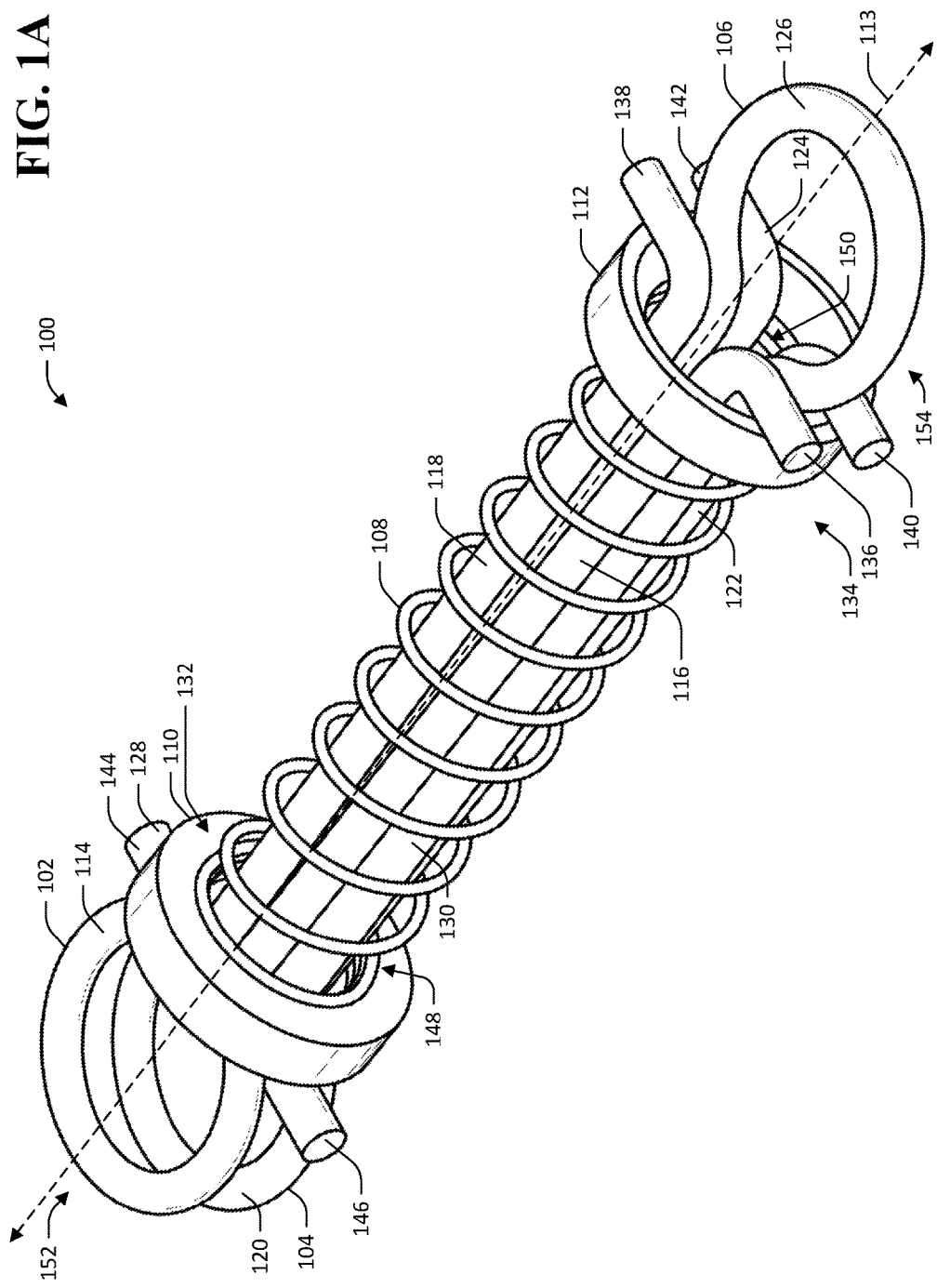
FIG. 1A is a perspective view of a first exemplary MDE spring.

Various technologies pertaining to drawbar extension springs that are manufacturable to have a small size and a small variation on free length are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

FIGS. 1A-1D illustrate various view of an exemplary MDE spring 100, wherein the MDE spring can be manufactured to have a small size (e.g., free length of less than 1.5 inches, free length of less than 1 inch, free length of less than 0.75 inch) and a small variation on its free length (e.g., from a nominal free length, less than ±20% variation, less than ±15% variation, less than ±10% variation). With reference now solely to FIG. 1A, a perspective view of the exemplary MDE spring 100 is illustrated. The MDE spring 100 comprises three drawbar members 102-106, a spring coil 108, and two end caps 110, 112. Each of the drawbar members 102-106 comprises a looped end that protrudes from the spring coil 108 and two drawbar arms that extend through the interior of the spring coil 108 along a direction that is substantially parallel to an axis 113 of the spring coil 108 (e.g., an axis around which the spring coil 108 is wound). For example, as shown in FIG. 1A, drawbar member 102 comprises a looped end 114 and two drawbar arms 116, 118, drawbar member 104 comprises a looped end 120 and two drawbar arms 122, 124, and drawbar member 106 comprises a looped end 126 and two drawbar arms 128, 130. The looped ends 114, 120 protrude from a first end 132 of the spring coil 108 and the looped end 126 protrudes from a second end 134 of the spring coil 108. Each of the drawbar arms 116, 118, 122, 124, 128, 130 terminates in a respective bent end 136, 138, 140, 142, 144, 146 that protrudes from one of the ends 132, 134 of the spring coil 108 and extends outward from the axis 113. For example, drawbar arms 116, 118, 122, 124 respectively terminate in bent ends 136, 138, 140, 142 that protrude from the second end 134 of the spring coil 108 and drawbar arms 128, 130 respectively terminate in bent ends 144, 146 that protrude from the first end 132 of the spring coil 108. The spring coil 108 therefore surrounds at least a portion of each of the drawbar members 102-106, and the drawbar members 102-106 extend through the spring coil 108 in a direction that is substantially parallel to the axis 113 of the spring coil 108.

The end caps 110, 112 are positioned at the ends 132, 134 of the spring coil 108, respectively. The end caps 110, 112 are substantially annular. Each of the end caps 110, 112 has an opening that extends through the end cap along the axis 113 (or a substantially parallel axis). By way of example, the end cap 110 has an opening labeled 148 in FIG. 1A, and the end cap 112 has an opening labeled 150. The end caps 110, 112 encircle respective portions of the drawbar members 102-106. The spring coil 108 is configured to exert outward force at its ends 132, 134 (i.e., along the axis 113) responsive to compression of the spring coil 108. Thus, in a resting position of the MDE spring 100 (e.g., no external forces are applied to the MDE spring 100), the end cap 110 is pushed toward the bent ends 144, 146 of the drawbar members 106 and the end cap 112 is pushed toward the bent ends 136-142 of the drawbar members 102, 104. The end caps 110, 112 are therefore held in place between the spring coil 108 and bent portions of the drawbar members 102-106. The bent ends and looped ends of the drawbar members extend through the openings 148, 150 in the end caps 110, 112, defining ends 152, 154 of the MDE spring 100. The looped ends 114, 120, 126 lie in substantially parallel planes. Similarly, the drawbar arms 116, 118, 122, 124, 128, 130 lies in substantially parallel planes.

As forces are applied to the looped ends 114, 120, 126 of the drawbar members 102, 104, 106 along the axis 113 and directed away from the MDE spring 100, the bent ends 136, 138, 140, 142, 144, 146 of the drawbar members 102, 104, 106 force the end caps 110, 112 toward one another, thereby compressing the spring coil 108. Extension of the MDE spring 100 therefore causes a compression of the spring coil 108. The spring coil 108 is configured such that compression of the spring coil 108 causes the spring coil 108 to exert forces on the end caps 110, 112 that opposes the compression of the spring coil 108. Thus, the MDE spring 100 is configured to oppose extension of the MDE spring 100 along its axis 113.

The MDE spring 100 improves upon conventional extension spring designs. The looped ends 114, 120, 126 of the drawbar members 102, 104, 106 are less prone to stress failures than conventional hook designs, as stresses in the looped ends 114, 120, 126 are more distributed than stresses in open hooks. Furthermore, the drawbar arms 116, 118, 122, 124, 128, 130 damp transverse (i.e., perpendicular to the axis 113) motion of the spring coil 108, reducing the likelihood that the MDE spring 100 will make unintended contact with other portions of a system in which the MDE spring 100 is deployed as compared with a conventional extension spring.

The MDE spring 100 further improves upon conventional spring designs by enabling precise control of the resulting free length of the MDE spring 100 in manufacturing. The end caps 110, 112 facilitate manufacturing of the MDE spring 100 to have a precise free length when no external forces are applied to the MDE spring 100. Referring now to FIG. 1B, a top-down view of the MDE spring 100 is shown. In the top-down view of FIG. 1B, the length $L_T$ of the MDE spring 100 is shown. When no external forces are applied to the MDE spring 100, the length $L_T$ is the free length of the MDE spring 100. In the absence of the end caps 110, 112, the free length MDE spring 100 can vary depending upon a length $L_C$ of the spring coil 108. Without the end caps 110, 112, the length $L_C$ of the spring coil 108 depends upon a bending radius of the bent ends 136, 138, 140, 142, 144, 146 of the drawbar arms 116, 118, 122, 124, 128, 130. For example, in absence of the end caps 110, 112, the ends 132, 134 of the spring coil 108 will make contact with the bent ends 136, 138, 140, 142, 144, 146 at different locations (and thus the spring coil 108 will have a different length) depending upon a diameter of the spring coil 108. The end caps 110, 112 maintain a precise free length of the MDE spring 100 by providing substantially flat surfaces on which the ends 132, 134 of the spring coil 108 rest, thereby maintaining substantially the same distance between the ends 132, 134 of the spring coil 108 regardless of the spring coil's diameter (provided the diameter of the spring coil 108 is less than or equal to the diameter of the end caps 110, 112).

Figure 2:
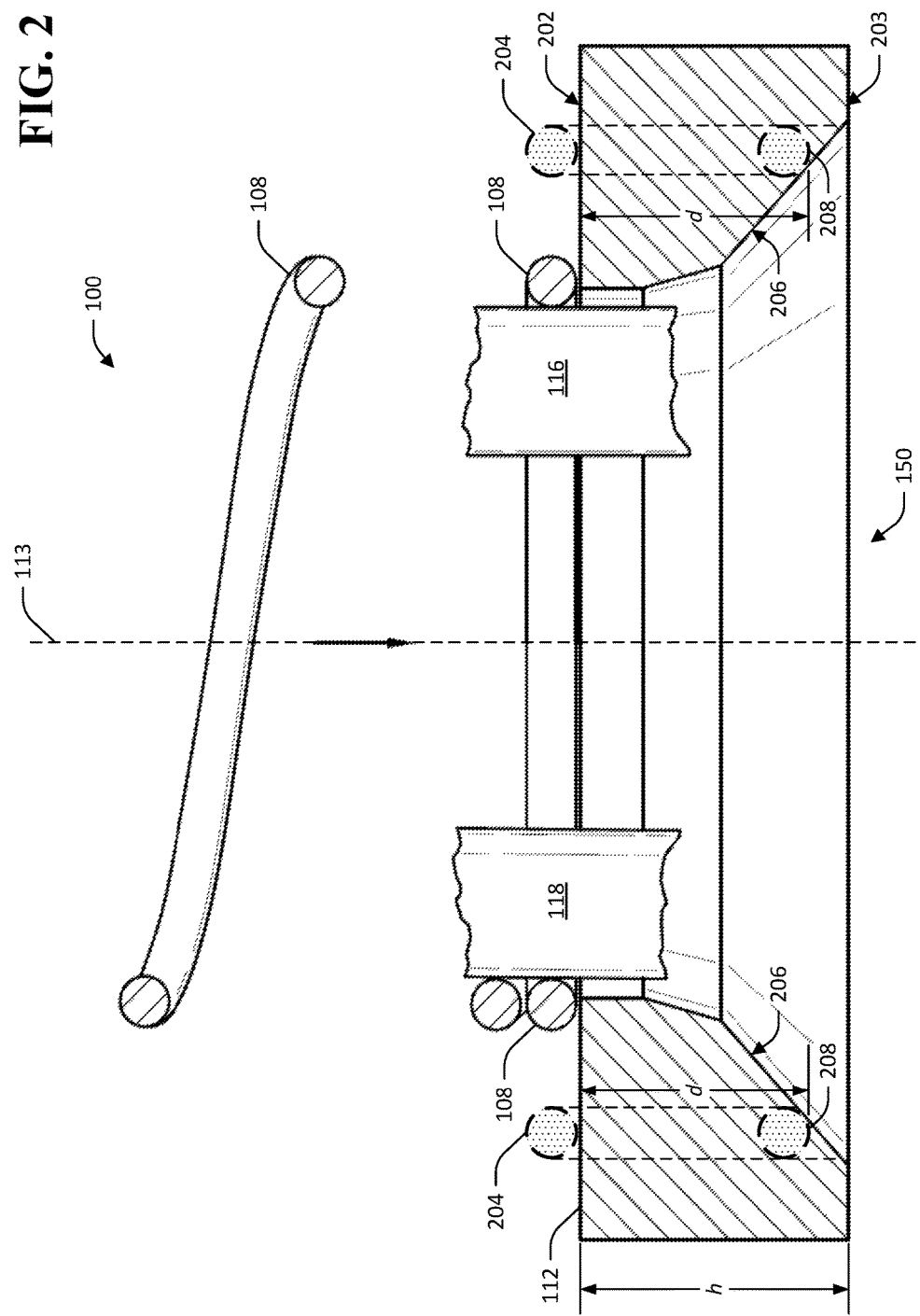
FIG. 2 is a partial cross-sectional view of an end of the first exemplary MDE spring.

By way of illustration, and referring now to FIG. 2, a cross-sectional view of a portion of the MDE spring 100 is shown, the cross-section taken along axis 113 as shown in FIGS. 1A and 1B. The cross-sectional view of FIG. 2 depicts the spring coil 108 as it is positioned on a surface 202 of the end cap 112. As shown in FIG. 2, the opening 150 that extends through the end cap is tapered such that the opening 150 has a greater diameter at the inner first surface 202 of the end cap 112, where the spring coil 108 contacts the end cap 112, than at an outer second surface 203 of the end cap 112.

Also depicted in FIG. 2 are various positions of a wider spring coil that has a diameter greater than the spring coil 108. A first position 204 of the wider spring coil is shown, where the wider spring coil rests on the surface 202 of the end cap 112. As shown, the first position 204 of the wider spring coil is horizontally aligned with the spring coil 108 on the surface 202 of the end cap 112. Thus, in the MDE spring 100, the spring coil 108 can maintain substantially the same length over a variety of different diameters, since the end caps 110, 112 provide a substantially flat surface on which the ends 132, 134 of the spring coil 108 rest.

In contrast, absent the end caps 110, 112, the length of the spring coil 108 may vary from one drawbar spring to another due to imprecision in the manufacturing of various components of a drawbar spring. Suppose in FIG. 2, for example, that the drawbar arms 116, 118 bend outward to the bent ends 136, 138 (not pictured in FIG. 2) along a same path as an interior surface 206 of the opening 150 shown in FIG. 2. In this case, in the absence of the end cap 112, the wider spring coil would rest on the bent ends 136, 138 of the drawbar member 102 at a second position 208 that is separated from the position of the spring coil 108 by a distance d. Where a drawbar extension spring is small (e.g., less than two inches in length) the distance d can be a large portion of the overall length of the spring coil. A height h of the end cap 112 may also be subject to some variance in manufacturing, but in general it is easier to manufacture the end cap (which may be, e.g., a ring of machined metal such as bronze, steel, copper, etc.) to have a height within a desired tolerance of a nominal value than it is to control the variable distance d by simultaneously precisely controlling a bending radius of the bent ends 136, 138 of the drawbar member 102 and a diameter of the spring coil 108. Thus, the end caps 110, 112 facilitate maintaining a precise free length of the MDE spring 100 by providing flat surfaces on which the ends 132, 134 of the spring coil 108 rest during operation of the MDE spring 100.

Referring now to FIGS. 1C and 1D, partial perspective views of the ends 154, 152 of the MDE spring 100 are shown. FIG. 1C illustrates a perspective view of the second end 154 of the MDE spring 100 while FIG. 1D illustrates a perspective view of the first end 152 of the MDE spring 100. As described above with respect to FIG. 1A and as shown further in FIG. 1C, the drawbar members 102-106 are arranged such that the looped end 126 of drawbar member 106 protrudes from the opening 150 and is positioned between the bent ends 136, 138 of drawbar member 102 and the bent ends 140, 142 of drawbar member 104. Similarly, and as shown in FIG. 1D, the drawbar members 102-106 are arranged such that the looped ends 114, 120 of the drawbar members 102 and 104, respectively, and the bent ends 144, 146 of drawbar member 106 protrude from the opening 148 in the first end 152 of the MDE spring. The bent ends 144, 146 are positioned between the looped ends 114, 120. This arrangement of the drawbar members 102-106 inhibits relative rotational motion of the drawbar members 102-106 with respect to one another.

Motion of the drawbar members 102-106 relative to one another can be further inhibited by geometry of the drawbar members 102-106. For example, and referring again to FIG. 1B, the drawbar arms 116, 118, 122, 124, 128, 130 of the drawbar members 102-106 can extend along the length of the MDE spring 100 (i.e., in a direction of the axis 113) at an angle offset by ±θ from the axial direction 113 of the spring coil 108. By way of example, and as shown in FIG. 1B, the drawbar arms 116, 118 extend along respective directions 156, 158. The drawbar arm 116 is offset from the axis 113 of the spring coil 108 by +θ whereas the drawbar arm 118 is offset from the axis 113 of the spring coil 108 by −θ. Thus, the drawbar arms of each of the drawbar members 102-106 splay outward as they extend along the length of the MDE spring 100 from the looped end toward the bent ends of their respective drawbar members. In exemplary embodiments the directions 156, 158 are substantially parallel to the axis 113 (e.g., θ≤30°, θ≤20°, θ≤10°).

Figure 3B:
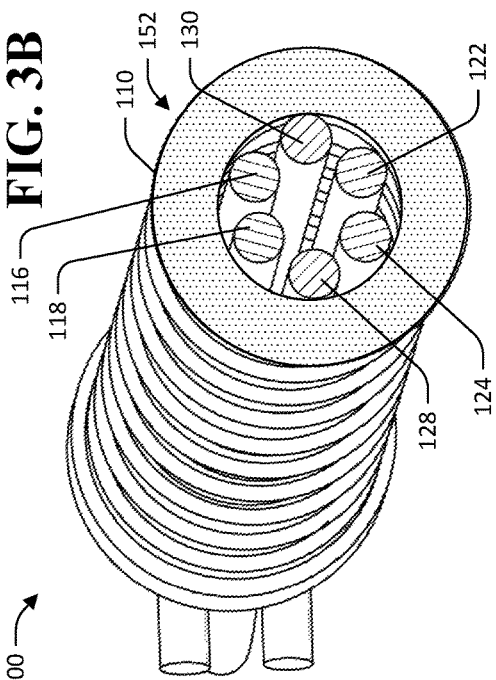
FIG. 3B is a cross-sectional perspective view of the second end of the first exemplary MDE spring.
Figure 3A:
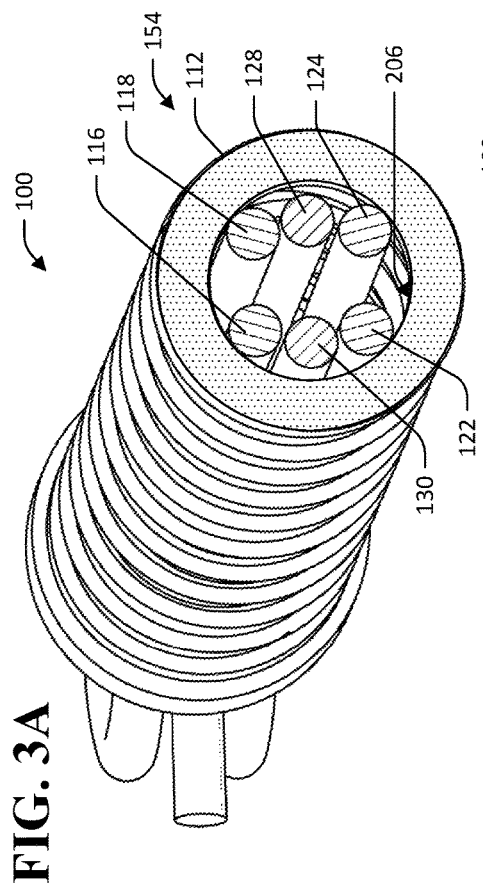
FIG. 3A is a cross-sectional perspective view of the first end of the first exemplary MDE spring.

In exemplary embodiments, the drawbar arms 116, 118, 122, 124, 128, 130 can be shaped such that as they splay outward they make contact with the end caps 110, 112. For example, and referring now to FIGS. 3A and 3B, cross-sectional views of ends 152 and 154 of the MDE spring 100 are shown wherein each of the drawbar arms 116, 118, 122, 124, 128, 130 makes contact with the one of the end caps 110, 112 that is closest to the bent ends of the drawbar arm. Referring now solely to FIG. 3A, a cross-sectional view of the second end 154 of the MDE spring 100 is shown, the cross-section taken along a line 160 shown in FIG. 1B. As shown in the cross-sectional view of FIG. 3A, the drawbar arms 116, 118 of drawbar member 102 and the drawbar arms 122, 124 of drawbar member 104 splay outward from a center of the spring coil 108 so as to make contact with the inside surface 206 of the end cap 112. By contrast, the drawbar arms 128, 130 of drawbar member 106 are further away from the end cap 112 at the cross-section along line 160 than the drawbar arms 116, 118, 122, 124, and the drawbar arms 128, 130 do not make contact with the end cap 112. Referring now solely to FIG. 3B, a cross-sectional view of the first end 152 of the MDE spring 100 is shown, the cross-section taken along a line 162 shown in FIG. 1B. As shown in the cross-sectional view of FIG. 3B, the drawbar arms 128, 130 of drawbar member 106 splay outward from a center of the spring coil so as to make contact with an inside surface 302 of the end cap 110. The drawbar arms 116, 118, 122, 124 are further away from the end cap 110 at the cross-section along line 162 than the drawbar arms 128, 130, and the drawbar arms 116, 118, 122, 124 do not make contact with the end cap 110. Thus, drawbar arms of the drawbar members 102-106 can be splayed outward so as to make contact with the end cap nearest their bent ends and not to make contact with the end cap nearest their looped end. It is to be understood, however, that while drawbar arms are shown and described herein with respect to FIGS. 3A and 3B as making contact with the end caps 110, 112, in other embodiments not all of the drawbar arms need make contact with either of the end caps 110, 112. In other embodiments, drawbar arms of drawbar members of an MDE spring do not splay outward from the axis of the spring coil, and extend along a length of the MDE spring along directions that are parallel to the axis of the spring coil. In any of these various embodiments, the drawbar arms 116, 118, 122, 124, 128, 130 damp transverse motion of the spring coil 108 that is perpendicular to its axis 113.

In other embodiments of an MDE spring, the MDE spring incorporates a first spring coil wound in a first direction and a second spring coil wound in a second direction. Referring now to FIG. 4, an exemplary MDE spring 400 comprising first and second spring coils is shown. The MDE spring 400 comprises the drawbar members 102, 104, 106, the spring coil 108, and two end caps 402 and 404, arranged as set forth above with respect to FIG. 1A, wherein the end caps 402 and 404 are positioned as described above with respect to end caps 110 and 112, respectively. The MDE spring 400 further comprises a second spring 406 that surrounds at least a portion of the drawbar members 102, 104, 106 (e.g., the same portion that is surrounded by the first spring coil 108) and that is positioned between the end caps 402-404. An axis of the windings of the second spring coil 406 is either coincident with the axis 113 of the first spring coil 108 or substantially parallel to the axis 113 of the first spring coil 108. The second spring coil 406 provides redundancy in high-consequence applications so that failure of one of the spring coils 108, 406 does not result in total failure of the MDE spring 400. In exemplary embodiments, the first spring coil 108 and the second spring coil 406 are wound in opposite directions to inhibit tangling of the spring coils 106, 406. For example, as shown in FIG. 4, the first spring coil 108 is wound in a right-hand-rule direction and the second spring coil 406 is wound in a left-hand-rule direction.

In exemplary embodiments, the end caps 402, 404 may be shaped similarly to the end caps 110, 112 such that the spring coils 108, 406 rest on a same respective flat surface of each of the end caps 402, 404. In other exemplary embodiments, each of the end caps 402, 404 is shaped so as to provide a first surface on which the first spring coil 108 rests and a second surface on which the second spring coil 406 rests. Referring now to FIGS. 5A-5C, various views of an exemplary end cap 500 is shown, wherein the end cap 500 has first and second surfaces for respective first and second spring coils. Referring now solely to FIG. 5A, a perspective view of the end cap 500 is shown depicting an interior side of the end cap 500 that faces the springs 108, 406 of the MDE spring 400. The end cap 500 is substantially annular such that the end cap 500 has a circular shape and a substantially circular opening 502 that extends through the end cap 500. The end cap 500 has a first surface 504 to accommodate a first spring coil having a first diameter and a second surface 506 that accommodates a second spring coil having a second diameter. The first surface 504 comprises an outer portion of the end cap 500. The second surface 506 comprises an inner portion of the end cap 500 and is raised from the first surface 504. Thus, referring now to FIG. 5B, which depicts a side view of the end cap 500, the second surface 506 is shown raised from the first surface 504 such that the second surface 506 is separated from the first surface 504 by a distance of $d_2$. The distance $d_2$ can be controlled in manufacturing of the end cap 500 to allow, for example, the springs 108 and 406 of the MDE spring 400 to have different lengths in a rest position of the MDE spring 400. In turn this enables a greater selection of suitable constructions for the spring coil 406 for a given spring output profile than if the spring coil 406 were constrained to have a same length as the spring coil 108 in a rest position of the MDE spring 400. Referring now to FIG. 5C, a perspective view of the end cap 500 is shown depicting an exterior side of the end cap 500 that faces away from the springs 108, 406 of the MDE spring 400. The exterior side of the end cap 500 comprises a tapered surface 508 to accommodate looped ends or bent ends of drawbar members in an MDE spring.

Figure 6:
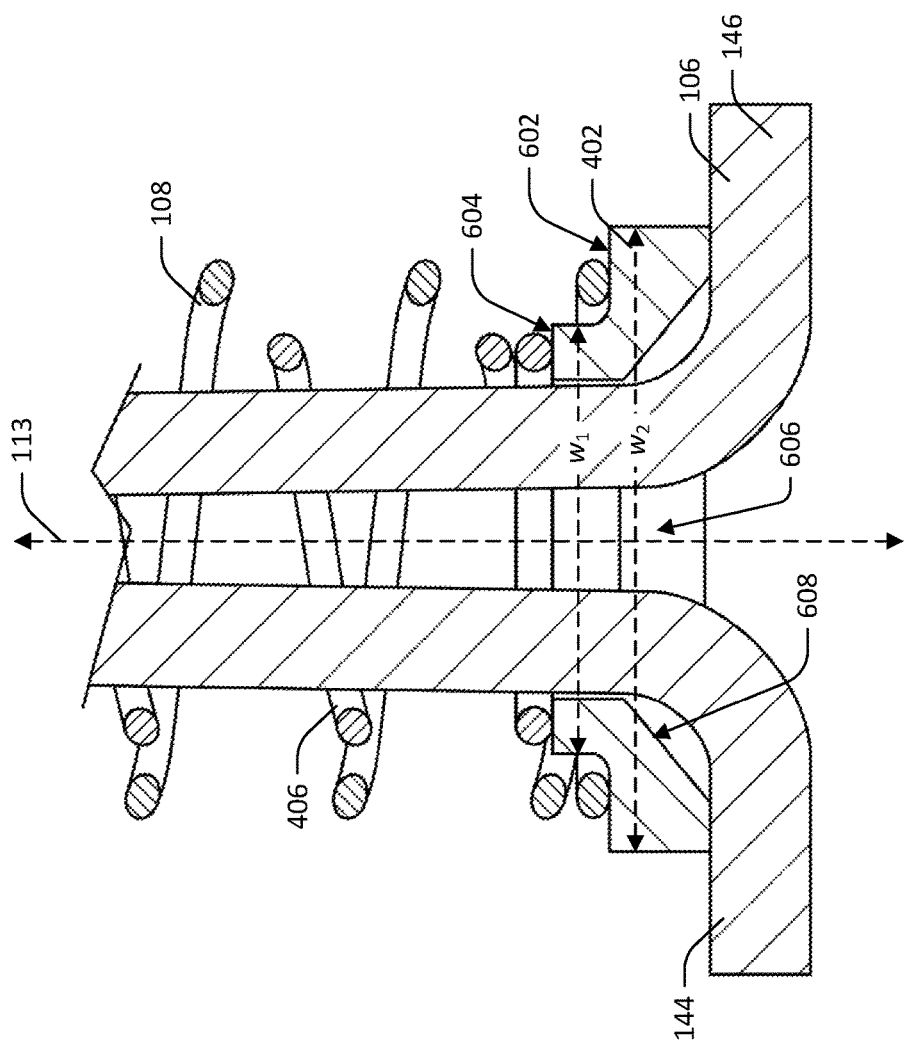
FIG. 6 is a partial cross-sectional view of an end of the second exemplary MDE spring.

Referring now to FIG. 6, a cross-sectional view of the MDE spring 400 is shown. The cross-sectional view of FIG. 6 depicts the arrangement of the springs 108, 406 on the end cap 402. As shown in FIG. 6, the springs 108 and 406 are wound in opposite directions, and the first spring 108 has a greater diameter than the second spring 406. The first spring 108 rests on a surface 602 of an outer portion of the end cap 402, while the second spring 406 rests on a surface 604 of a raised inner portion of the end cap 402. The inner portion of the end cap 402 has a width $w_1$ whereas the outer portion of the end cap has a greater width $w_2$. The spring coil 406 has a diameter that is less than or equal to w (and therefore necessarily less than $w_2$). The spring coil 108 has a diameter that is less than or equal to the width $w_2$ but greater than the width $w_1$. The end caps can be manufactured to have a variety of desirable widths. In an exemplary embodiment, an outer width $w_2$ of the end cap 402 is approximately between 0.075 inches and 0.125 inches and an inner width $w_1$ of the end cap 402 is approximately between 0.060 inches and 0.075 inches (provided $w_2 > w_1$). In another exemplary embodiment, a diameter of the wider spring coil 108 is approximately between 0.075 inches and 0.125 inches, and a diameter of the narrower spring coil 406 is approximately between 0.060 inches and 0.075 inches. The end cap 402 includes an opening 606 that extends through the end cap 402 and through which protrude bent ends 144, 146 of drawbar member 106. The end cap 402 comprises a tapered surface 608 that defines the opening 606 in order to accommodate a variety of bending radii of the bent ends 144, 146 of the drawbar member 106.

Figure 7:
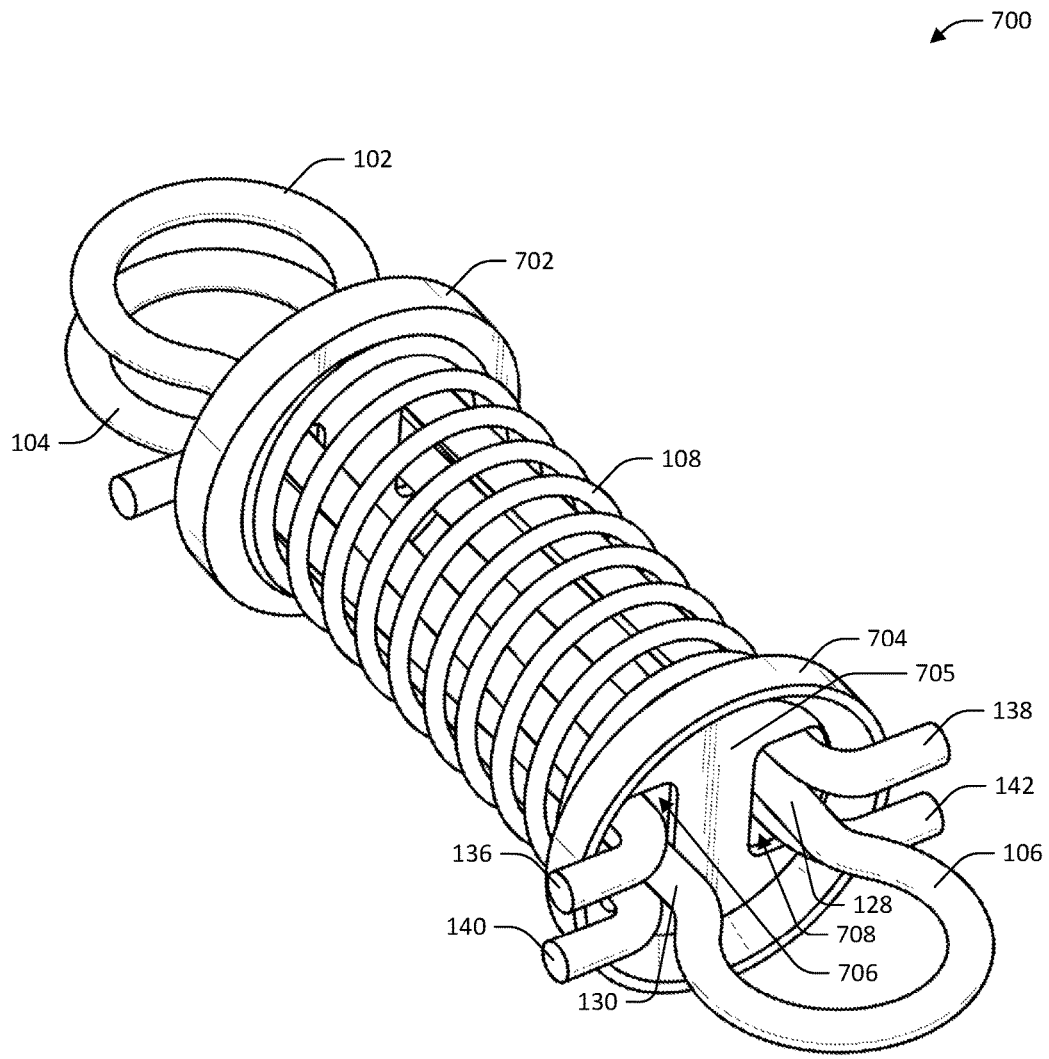
FIG. 7 is a perspective view of a third exemplary MDE spring.

Referring now to FIG. 7, a perspective view of another exemplary MDE spring 700 is shown. The MDE spring 700 comprises the drawbar members 102, 104, 106 and the spring coil 108 arranged as described above with respect to FIG. 1A. The MDE spring 700 further comprises first and second end caps 702, 704 that are positioned at opposite ends of the spring coil 108. Thus, the first end cap 702 is positioned at the first end 132 of the spring coil 108, and the second end cap 704 is positioned at the second end 134 of the spring coil 108. The end caps 702, 704 each comprise a closed end that includes a plurality of openings to accommodate the various drawbar members 102, 104, 106. For example, as shown in FIG. 7, the end cap 704 comprises a closed end face 705 that includes a first opening 706 through which bent ends 136 and 140 of respective drawbar members 102 and 104 protrude, and a second opening 708 through which bent ends 138 and 142 of same respective drawbar members 102 and 104 protrude. Drawbar arms 130 and 128 also pass through openings 706 and 708, respectively. End caps 702, 704 can be employed to further inhibit rotational motion of the drawbar members 102, 104, 106.

Figure 8A:
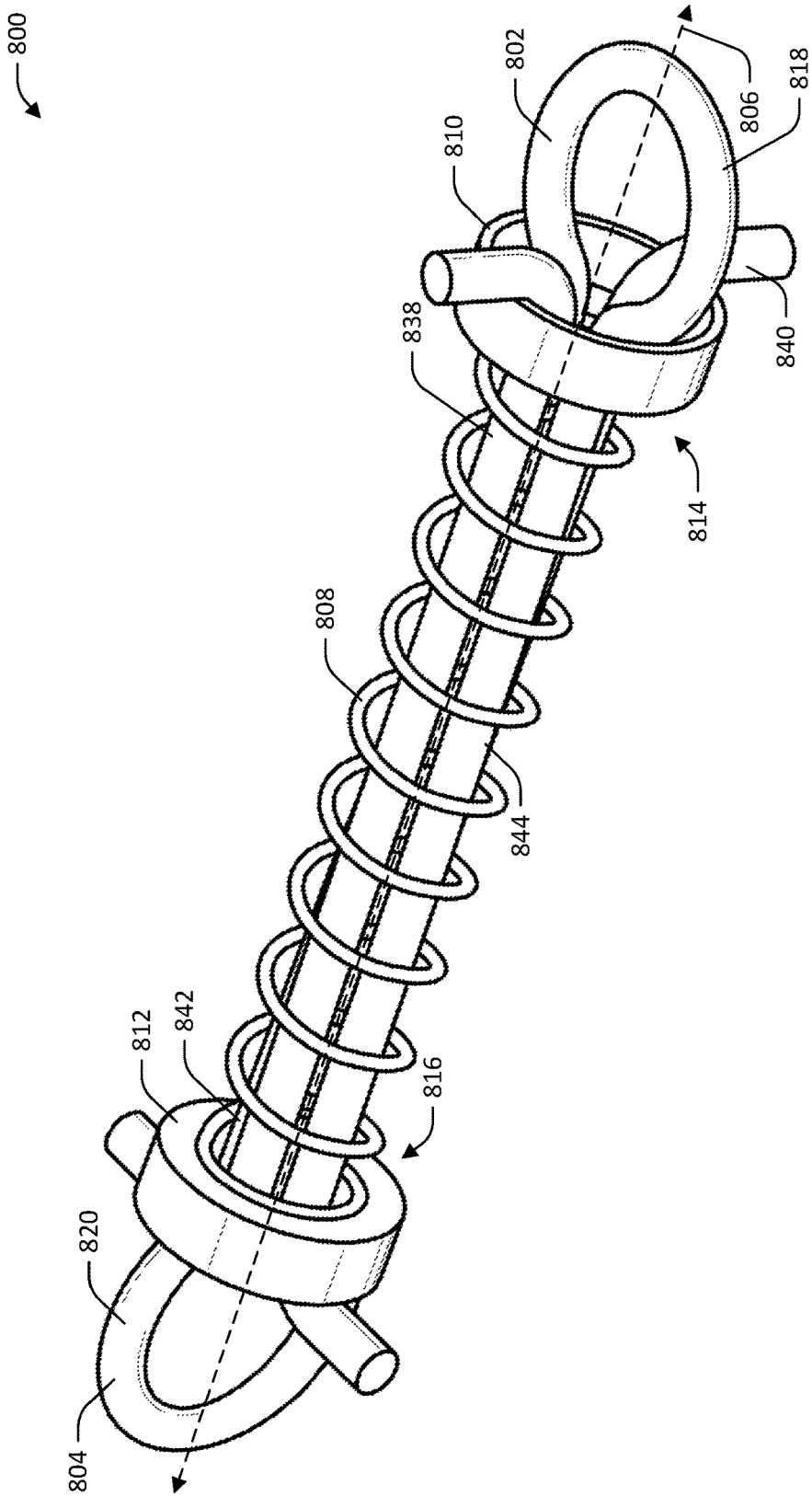
FIG. 8A is a perspective view of a fourth exemplary MDE spring.
Figure 8B:
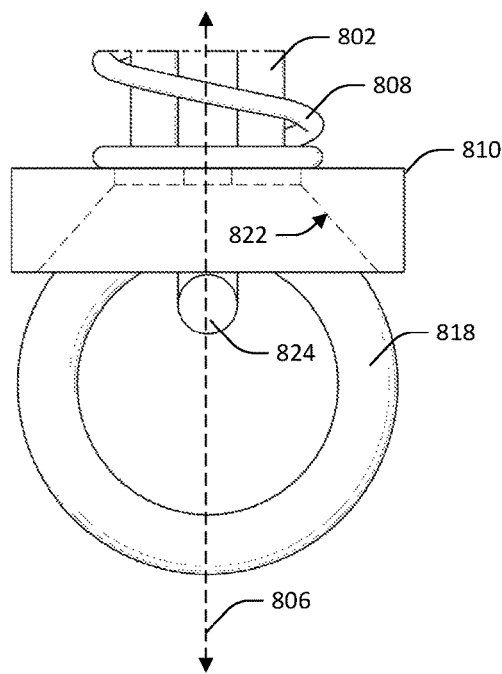
FIG. 8B is a partial view of a first end of the fourth exemplary MDE spring.
Figure 8C:
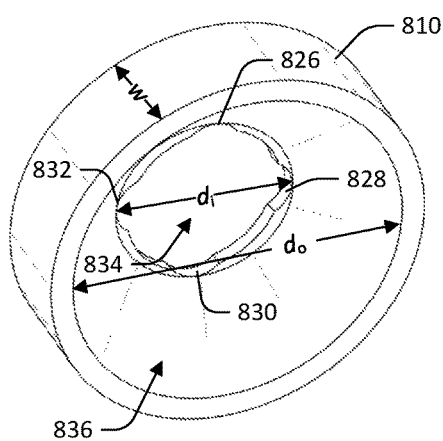
FIG. 8C is a partial view of an end cap of the fourth exemplary MDE spring.

Referring now to FIGS. 8A-8E, various views of still another exemplary MDE spring 800 are illustrated. Referring now solely to FIG. 8A, a perspective view of the MDE spring 800 is shown. The MDE spring 800 comprises a first drawbar member 802 and a second drawbar member 804 that extend along a common axis 806, a spring coil 808, and end caps 810, 812 positioned at respective ends 814, 816 of the spring coil 808. In the MDE spring 800, while the two drawbar members 802, 804 extend along the common axis 806, the drawbar members 802, 804 are aligned with an angular offset from one another. Thus, a first looped end 818 of the first drawbar member 802 lies substantially in a first plane (not shown) and a second looped end 820 of the second drawbar member 804 lies substantially in a second plane (not shown) that is offset from the first plane by an angle ϕ. In exemplary embodiments, the looped ends 818, 820 of the drawbar members 802, 804 have an angular offset of between 75° and 90°, between 45° and 90°, or between 30° and 90°. Referring now to FIG. 8B, a top-down view of a portion of the MDE spring 800 is shown, wherein a shape of an interior surface 822 of the end cap 810 is depicted with dotted lines. FIG. 8B further depicts the looped end 818 of the drawbar member 802, and a bent end 824 of the second drawbar member 804. The looped end 818 lies substantially in the plane of the page in FIG. 8B, whereas the bent end 824 is aligned with a plane that extends along the axis 806 and further extends into and out of the page in FIG. 8B. Hence, in the exemplary MDE spring 800, the first drawbar member 802 and the second drawbar member 804 are arranged at an offset angle of 90°.

Figure 8D:
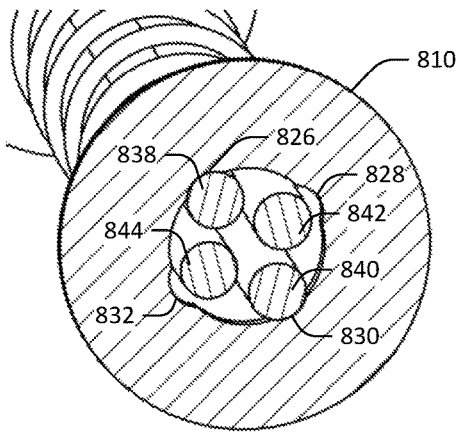
FIG. 8D is a partial cross-sectional view of the first end of the fourth exemplary MDE spring.
Figure 8E:
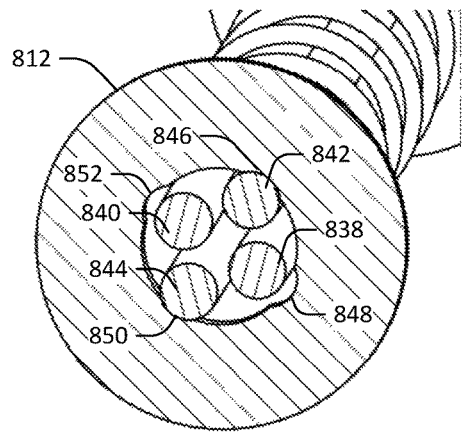
FIG. 8E is a partial cross-sectional view of the second end of the fourth exemplary MDE spring.

In the MDE spring 800, the end caps 810, 812 have grooved features that inhibit rotational motion of the drawbar members 802, 804 in order to facilitate maintaining a desired alignment of the drawbar members 802, 804. For instance, and referring now solely to FIG. 8C, the end cap 810 is shown, wherein the endcap comprises a plurality of grooves 826-832 that accommodate drawbar arms of the drawbar members 802, 804. The end cap 810 comprises an opening 834 that defines an inner diameter and a tapered surface 836 that extends from the inner diameter outward to an outer diameter $d_o$ such that the end cap 810 has a thickness of w. Referring now to FIG. 8D, a partial cross-sectional view of the MDE spring 800 is shown illustrating alignment of drawbar arms of the drawbar members 802, 804 in the grooves 826-832. The cross-sectional view of the MDE spring 800 shows drawbar arms 838, 840 of the drawbar member 804 that in a resting position of the MDE spring 800 are positioned in the grooves 826, 830, respectively. In the resting position of the MDE spring 800, drawbar arms 842, 844 of the drawbar member 802 are positioned outside grooves 828, 832, respectively. Referring now to FIG. 8E, another partial cross-sectional view of the MDE spring 800 is shown illustrating alignment of the drawbar arms 838-844 in a plurality of grooves 846-852 that are formed in the end cap 812. In a resting position of the MDE spring 800, drawbar arms 842, 844 of the drawbar member 802 are positioned in the grooves 846, 850, respectively. In the resting position of the MDE spring 800 the drawbar arms 838, 840 of the drawbar member 804 are positioned outside of the grooves 848, 852, respectively. At each of the end caps 810, 812 the grooves in the inner diameter of the end cap inhibit rotational motion of bent ends of the drawbar members 802, 804, thereby maintaining relative alignment of the drawbar members 802, 804 around the axis 806. A relative alignment of the drawbar members may therefore be selected by appropriate spacing of the grooves in the endcaps 810, 812.

Referring now to FIGS. 9A and 9B, yet another MDE spring 900 is illustrated, wherein FIG. 9A shows a perspective view of the MDE spring 900 and FIG. 9B shows a cutaway perspective view of the MDE spring 900. The MDE spring 900 comprises a first member 902 and a second member 904 aligned along an axis 906, the second member 904 configured to move along the axis 906 relative to the first member 902. The first member 902 comprises a tube that is substantially hollow and cylindrical. The first member 902 includes an opening 908 at a first end 910 of the tube, wherein the opening 908 can be used to affix the MDE spring 900 to a spring post. For example, a spring post can be positioned such that the spring post extends through the opening 908, causing the spring post to hold the first member 902 in place as a force is exerted on the second member 904 along the axis 906. By way of another example, a hook (not shown) can be extended through the opening such that the hook causes the first member 902 to be held in place as a force is exerted on the second member 904 along the axis 906. The second member 904 comprises a tube that is substantially cylindrical, and that has an opening 912 at a first end 914 of the member 904. The MDE spring 900 further includes a looped hook 916 that is hooked through the opening 912 at the first end 914 of the member 904. The looped hook 916 can be affixed to a moving object, a spring post, etc. When a force exerted on the looped hook 916 causes displacement of the second member 904 along the axis 906, the MDE spring 900 exerts a spring force along the axis 906 that tends to oppose motion of the member 904 away from the first member 902 along the axis 906.

Referring now solely to FIG. 9B, various internal features of the MDE spring 900 are described. As shown in the cut-away perspective view of the MDE spring 900, the second member 904 extends along the axis 906 through an interior 918 of the first member 902. At a second end 920 of the second member 902, an end cap 922 is affixed to the second member 904. In exemplary embodiments, the end cap 922 is welded to the second end 920 of the second member 902. In other embodiments, the end cap 922 is affixed to the second member 902 by way of an adhesive, by way of fasteners, etc. In the MDE spring 900 shown in FIG. 9B, the second member 904 is shown as extending through the end cap 922. However, in other embodiments, the second member 904 does not extend through the end cap 922.

A second end cap 924 is affixed to the first member 902 of the MDE spring 900 at a second end 926 of the first member 902. The second end cap 926 comprises an opening 928 through which the second member 904 is able to freely move along the axis 906. The MDE spring 900 further comprises a spring coil 930 that is positioned inside the first member 902 and between the first end cap 922 and the second end cap 924. The spring coil 930 is a compression spring that exerts a spring force that opposes compression of the spring coil 930. The MDE spring 900 also includes a second spring coil 932 that is positioned inside the first member 902 and between the end caps 922, 924. It is to be understood that in other embodiments the MDE spring 900 can include only the spring coil 930, or more spring coils than the spring coils 930, 932. The end caps 922, 924 each comprise a first interior surface that faces the interior 918 of the first member 902 of the MDE spring 900 and that makes contact with the spring coils 930, 932. For example, the end cap 922 comprises an interior surface 934, and the end cap 924 comprises an interior surface 936.

In an exemplary operation of the spring, the MDE spring 900 is fixed at the first end 910 of the first member 902 (e.g., by way of a spring post extending through the opening 908) and a moving object exerts a force on the looped hook 916 that pulls the looped hook 916 away from the first member 902 along the axis 906. As the looped hook 916 is pulled along the axis 906, the second member 904 and the first end cap 922 are also pulled along the axis 906, tending to cause compression of the spring coils 930, 932. As the spring coils 930, 932 are compressed, they exert forces outward along the axis 906 at their ends that tend to oppose such compression. Hence, the MDE spring 900 functions as an extension spring, tending to oppose extension of the second member 904 away from the first member 902. In an exemplary embodiment, the end cap 922 has a diameter that is substantially the same as an inside diameter of the first member 902. In various embodiments, a lubricating fluid can be applied to the end cap 922 or an interior surface of the first member 902 to facilitate motion of the end cap 922 through the interior space 918 of the first member 902.

While the MDE spring 900 shown in FIGS. 9A and 9B is depicted as comprising cylindrical members 902, 904, and substantially annular end caps 922, 924, it is to be understood that the members 902, 904 can be of substantially any shape (e.g., triangular tubes, square tubes, etc.). Furthermore, it is to be understood that the members 902, 904 need not be of the same shape. For example, in another embodiment the first member 902 can have a first shape and the second member 904 can have a second shape provided that dimensions of the second member 904 are sufficiently small relative to the first member 902 that the second member 904 can move within the first member 902 along the axis 906. In exemplary embodiments, a shape of the end caps 922, 924 is determined by the shapes of the members 902, 904. By way of example, the end cap 922 is shaped so as to be able to move within the interior 918 of the first member 902 along the axis 906. By way of another example, the end cap 924 is shaped such that the second member 904 is able to move freely through the opening 928 in the end cap 924. Other modifications to the MDE spring 900 that are necessary to facilitate movement of the endcap 922 and the second member 904 along the axis 906 for different shapes of the members 902, 904 are contemplated as being within the scope of the present disclosure.

It is to be understood that various modifications to the MDE springs 100, 400, 700, 800, 900 illustrated in the Figures and described herein are contemplated as being within the scope of the present disclosure. By way of example, while looped ends of drawbar members are depicted in the Figures as being round, it is to be understood that a looped end can be formed with substantially any shape in order to accommodate incorporation of an MDE spring into another device or system. For instance, looped ends of an MDE spring described herein can be made substantially triangular to accommodate use of the MDE spring with triangular spring posts. In other examples, while an MDE spring is described herein as being manufacturable to sizes of less than one inch in length, it is to be understood that the MDE spring may be manufactured in larger sizes while remaining consistent with the present disclosure. Other modifications are also contemplated as being consistent with the present disclosure.

In other instances, it is to be understood that various features described as pertaining to particular embodiments described herein are suitable for incorporation into other of the embodiments set forth herein. In one example, the MDE springs 100, 400 can be modified to incorporate end caps that have groove features, in order to inhibit rotational motion of the drawbar arms. In another example, the MDE springs 100, 700, 800 can each be modified to include a second counter-wound spring. Other combinations of features described herein are contemplated. Furthermore, while the MDE springs described in detail above are described herein as being miniaturizable, it is to be understood that such designs are suitable for manufacture to larger sizes as well.

Figure 10:
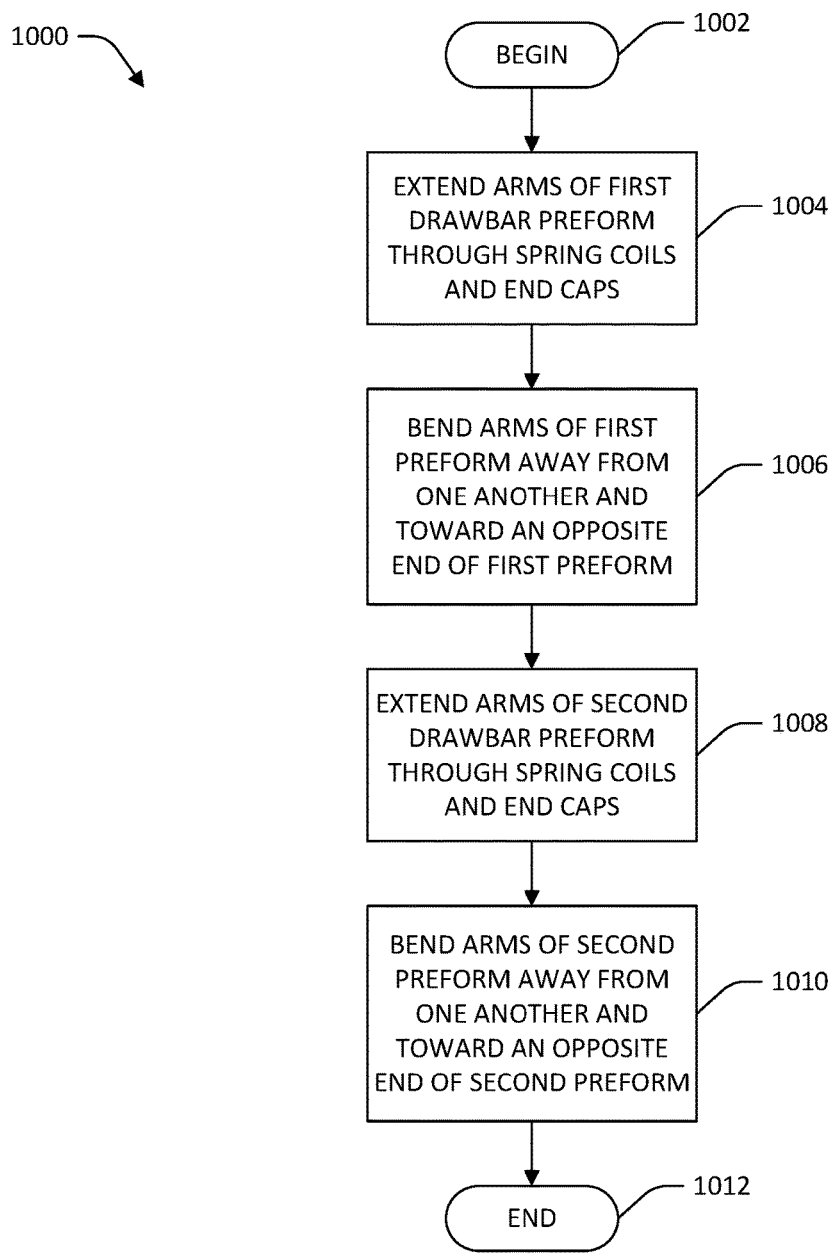
FIG. 10 is a flow diagram that illustrates an exemplary methodology for manufacturing an MDE spring.
Figure 11A:
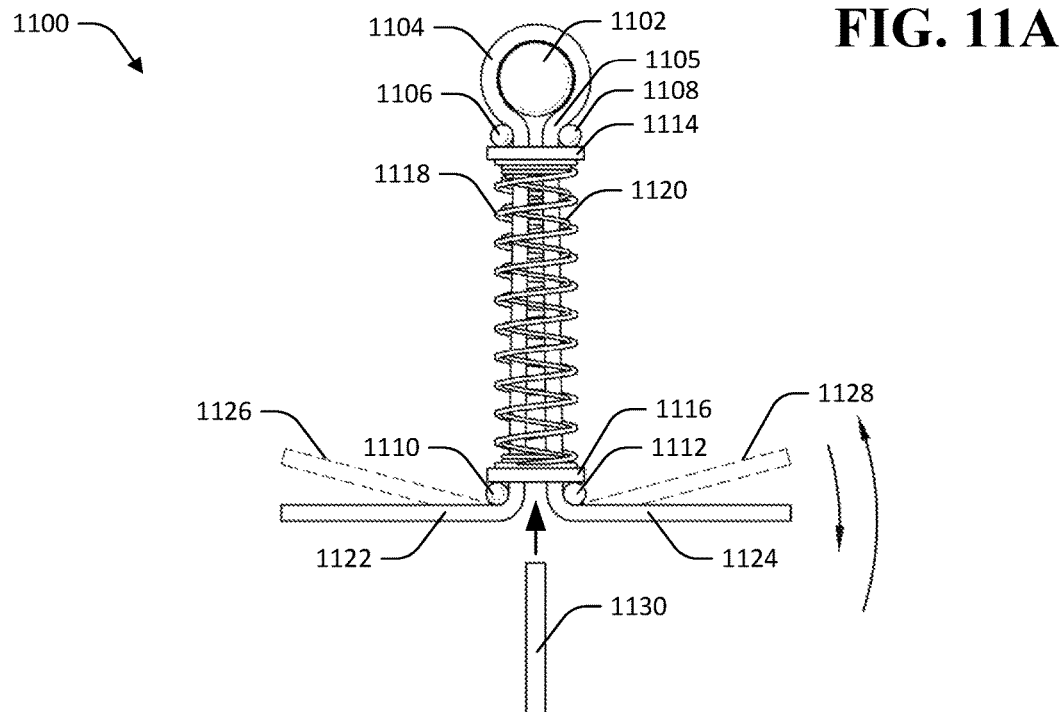
FIGS. 11A-11B are perspective views of an exemplary MDE spring during manufacture.
Figure 11B:
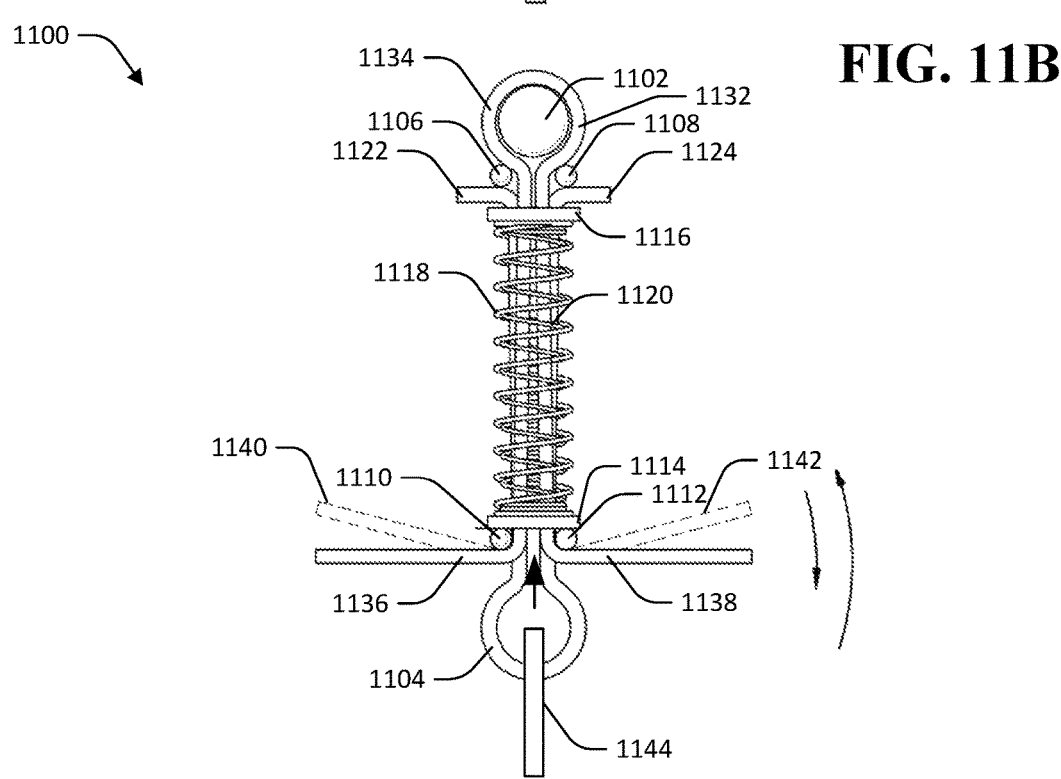

FIG. 10 illustrates an exemplary methodology 1000 relating to manufacture of an MDE spring according to various embodiments described herein such that the MDE spring has free length within a desired deviation from a nominal free length (e.g., less than ±20% deviation, less than ±15% deviation, less than ±10% deviation). While the methodology 1000 is shown and described as being a series of acts that are performed in a sequence, it is to be understood and appreciated that the methodology 1000 is not limited by the order of the sequence. For example, some acts can occur in a different order than what is described herein. In addition, an act can occur concurrently with another act. Further, in some instances, not all acts may be required to implement the methodology 1000. FIGS. 11A-11B illustrate an exemplary MDE spring 1100 during various stages of manufacture according to the methodology 1000 to facilitate understanding of the methodology 1000. FIGS. 11A-11B further illustrate a fixture that aids in performance of the methodology 1000 to construct the MDE spring 1100 to have a precise free length.

Referring now to FIG. 10, the methodology 1000 begins at 1002, and at 1004, arms of a drawbar preform are extended through a pair of counter-wound spring coils and a pair of end caps. In an exemplary embodiment and a pair of drawbar arms that extend away from the looped end. In the embodiment, as the drawbar arms extend away from the looped end the drawbar arms also diverge from one another. Prior to extending the drawbar arms through the spring coils and end caps at 1004, the drawbar arms can be compressed toward one another. Therefore, after the drawbar arms are extended through the spring coils and end caps at 1004 the drawbar arms can be released from compression such that the drawbar arms exert an outward force that pushes against the interior of the spring coils and the end caps.

At 1006, the drawbar arms are bent away from one another and toward an opposite end of the drawbar preform. For example, in the exemplary embodiment referenced above the drawbar arms are bent away from one another and toward the looped end of the preform. Referring now to FIG. 11A, an illustration of the exemplary MDE spring 1100 at step 1106 of the manufacturing methodology 1000 is shown. In FIG. 11A, the exemplary MDE spring 1100 is shown arranged within a fixture that comprises a large post 1102, around which is fitted a looped end 1104 of a first drawbar preform 1105, and four small posts 1106-1112 that are arranged at corners of a rectangular pattern disposed below the large post 1102. Between the top pair of posts 1106, 1108 and the bottom pair of posts 1110, 1112 are a pair of end caps 1114, 1116 and a pair of counter-wound spring coils 1118, 1120. The coils 1118, 1120 are compressed such that they force the end cap 1114 against the top posts 1106, 1108 and force the end cap 1116 against the bottom posts 1110, 1112. The drawbar preform 1105, the coils 1118, 1120, and the end caps 1114, 1116 are thusly held in place in the fixture. The drawbar preform 1105 comprises a pair of drawbar arms 1122, 1124 that extend through the end caps 1114, 1116 and the coils 1118, 1120 (e.g., as set forth in step 1004 of the methodology 1000). The drawbar arms 1122, 1124 are bent around the lower posts 1110, 1112 to respective first positions 1126, 1128 and then bent back to their final positions shown in FIG. 11A. During bending of the drawbar arms 1122, 1124, a shim 1130 can be inserted between the drawbar arms 1122, 1124 and the posts 1110, 1112 in order to force the drawbar arms 1122, 1124 to fit tightly against the end cap 1116. The drawbar arms 1122, 1124 can subsequently be cut to a shorter length to reduce a profile of the MDE spring 1100.

Referring again to FIG. 10, at 1008, arms of a second drawbar preform are extended through the spring coils and the end caps. Referencing now FIG. 11B, a view of the MDE spring 1100 subsequent to step 1008 of the methodology 1000 is shown. In FIG. 11B a second drawbar preform 1132 is shown, wherein the second drawbar preform 1132 comprises a looped end 1134 and two drawbar arms 1136, 1138 that are extended through the spring coils 1118, 1120 and the end caps 1114, 1116. To facilitate extension of the drawbar arms 1136, 1138 of the second preform 1132 through the spring coils 1118, 1120 and the end caps 1114, 1116, the MDE spring 1100 can be positioned in the fixture as shown in FIG. 11B. Thus, the drawbar arms 1122, 1124 of the first preform 1105 are positioned at the top posts 1106, 1108 and the end cap 1114 is positioned at the bottom posts 1110, 1112, wherein the arms 1122, 1124 and the end cap 1114 are held in place against the posts 1106-1112 by the spring coils 1118, 1120. The drawbar arms 1136, 1138 of the second preform 1132 can then be extended (prior to bending) through the end caps 1114, 1116, and spring coils 1118, 1120.

Referring again to FIG. 10, at 1010, the arms of the second drawbar preform are bent away from one another and toward an opposite end of the second preform. Now referring again to FIG. 11B, the drawbar arms 1136, 1138 of the second preform 1132 are bent away from one another and toward the looped end 1134 of the second preform 1132, to respective positions 1140, 1142, and then ultimately to the positions of the drawbar arms 1136, 1138 shown in FIG. 11B. During bending of the drawbar arms 1136, 1138, a shim 1144 can be inserted between the drawbar arms 1136, 1138 and the posts 1110, 1112 in order to force the drawbar arms 1136, 1138 to fit tightly against the end cap 1114. The shim 1144 can be shaped similarly to the shim 1130, as shown in FIG. 11B, or in other embodiments the shim 1144 can be shaped differently to facilitate insertion between the drawbar arms 1136, 1138 (e.g., to accommodate presence of the drawbar member 1104). As with the drawbar arms 1122, 1124 of the first preform 1105, the drawbar arms 1136, 1138 can be cut to reduce profile of the MDE spring 1100. Referring now again to FIG. 10, the methodology 1000 ends at 1012.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A spring system, comprising:
   a first drawbar member;
   a second drawbar member extending along a same axial direction as the first drawbar member;
   a third drawbar member extending along a same axial direction as the first drawbar member, the third drawbar member positioned such that the second drawbar member is disposed between the first drawbar member and the third drawbar member;
   a spring coil that surrounds at least a portion of the first drawbar member and at least a portion of the second drawbar member;
   a first end cap that encircles the first and second drawbar members; and
   a second end cap that encircles the first and second drawbar members, the first end cap and the second end cap positioned at respective first and second ends of the spring coil.

2. The spring system of claim 1, the first and second drawbar members comprising respective end loops, wherein the end loop of the first drawbar member and the end loop of the second drawbar member are disposed at an angle of between 45 degrees and 90 degrees with respect to one another.

3. The spring system of claim 1, wherein the first end cap comprises a first groove and the second end cap comprises a second groove, wherein the first and second grooves inhibit rotation of the first drawbar member and the second drawbar member relative to one another.

4. The spring system of claim 1, the first drawbar member comprises a first drawbar arm and a second drawbar arm, the second drawbar member comprises a third drawbar arm and a fourth drawbar arm, wherein the first drawbar arm and the second drawbar arm extend through an opening in the first end cap such that the first drawbar arm and the second drawbar arm make contact with interior walls of the opening in the first end cap, and wherein the third drawbar arm and the fourth drawbar arm extend through an opening in the second end cap such that the third drawbar arm and the fourth drawbar arm make contact with interior walls of the opening in the second end cap.

5. The spring system of claim 1, wherein the first drawbar member, the second drawbar member, and the third drawbar member have respective looped ends, wherein the looped ends are oriented in substantially parallel planes.

6. The spring system of claim 1, further comprising a second spring coil, the second spring coil surrounding at least the portion of the first drawbar member and at least the portion of the second drawbar member, a diameter of the second spring coil being greater than a diameter of the first spring coil.

7. The spring system of claim 6, wherein the first spring coil is wound in a first direction and the second spring coil is wound in a second direction, the second direction different from the first direction.

8. The spring system of claim 6,
wherein the first end cap comprises:
   a first outer portion; and
   a first inner portion, a surface of the first inner portion being raised from a surface of the first outer portion;
wherein the second end cap comprises:
   a second outer portion; and
   a second inner portion, a surface of the second inner portion being raised from a surface of the second outer portion; and
wherein the first spring coil makes contact with the first inner portion and the second inner portion, and the second spring coil makes contact with the first outer portion and the second outer portion.

9. The spring system of claim 8, the diameter of the first spring coil being less than or equal to a width of the first inner portion and a width of the second inner portion.

10. The spring system of claim 8, the diameter of the second spring coil being greater than a width of the first inner portion and a width of the second inner portion.

11. A drawbar spring comprising:
a first drawbar member;
a second drawbar member extending along a same axial direction as the first drawbar member;
a third drawbar member extending along the same axial direction as the first drawbar member and the second drawbar member, the third drawbar member positioned between the first drawbar member and the second drawbar member such that the first drawbar member and the second drawbar member inhibit rotation of the third drawbar member relative to the first drawbar member and the second drawbar member;
a first end cap that encircles the first drawbar member, the second drawbar member, and the third drawbar member;
a second end cap that encircles the first drawbar member, the second drawbar member, and the third drawbar member; and
a spring coil that surrounds respective portions of the first drawbar member, the second drawbar member, and the third drawbar member, wherein a first end of the spring coil rests on a surface of the first end cap and a second end of the spring coil rests on a surface of the second end cap.

12. The drawbar spring of claim 11, wherein the spring coil is a first spring coil, the drawbar spring further comprising a second spring coil that surrounds respective second portion of the first drawbar member, the second drawbar member, and the third drawbar member, the second spring coil having a greater diameter than the first spring coil, a first end of the second spring coil resting on a second surface of the first end cap, a second end of the second spring coil resting on a second surface of the second end cap.

13. The drawbar spring of claim 12 wherein the first spring coil and the second spring coil are wound in opposite directions.

* * * * *